United States Patent
Hogan et al.

(10) Patent No.: US 11,455,265 B2
(45) Date of Patent: Sep. 27, 2022

(54) DATA BUS DRIVER WITH ELECTRICAL ENERGY DUMP

(71) Applicant: Apple Inc., Cupertino, CA (US)

(72) Inventors: Roderick B. Hogan, San Francisco, CA (US); Nathan A. Johanningsmeier, San Jose, CA (US); James B. Reedy, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/187,427

(22) Filed: Feb. 26, 2021

(65) Prior Publication Data

US 2021/0182226 A1 Jun. 17, 2021

Related U.S. Application Data

(62) Division of application No. 15/974,635, filed on May 8, 2018, now Pat. No. 10,963,410.

(51) Int. Cl.
| | |
|---|---|
| *G06F 13/37* | (2006.01) |
| *G06F 13/372* | (2006.01) |
| *G06F 1/20* | (2006.01) |
| *H04R 3/00* | (2006.01) |

(52) U.S. Cl.
CPC ............ *G06F 13/372* (2013.01); *G06F 1/206* (2013.01); *H04R 3/007* (2013.01)

(58) Field of Classification Search
None
See application file for complete search history.

(56) References Cited

U.S. PATENT DOCUMENTS

2016/0225311 A1\* 8/2016 Hwang ................ G09G 3/3208
2018/0284836 A1\* 10/2018 Daanen ............ H03K 19/00323

\* cited by examiner

*Primary Examiner* — Scott C Sun
(74) *Attorney, Agent, or Firm* — Womble Bond Dickinson (US) LLP

(57) ABSTRACT

A group of transistors is configured to drive a bus at time slots, to express data on the bus. The group of transistors dissipates an amount of electrical energy when driving the bus to a logic level opposite to a logic level present on the bus in an immediate preceding time slot. The group of transistors is arranged to dump another amount of electrical energy. Dumping of the other amount of electrical energy is responsive to driving the bus to a logic level that is the same as present on the bus in an immediate preceding time slot. The dumped amount of electrical energy is equivalent to the amount of energy dissipated by the transistors when transitioning the bus to a different logic level. Other aspects are also described.

19 Claims, 5 Drawing Sheets

DATA BUS DRIVER WITH ELECTRICAL ENERGY DUMP

This application is a divisional of pending U.S. application Ser. No. 15/974,635 filed 8 May 2018.

FIELD

An aspect of the disclosure here relates to a microphone data bus driver that may be insensitive to thermally induced interference from an earlier driven bit value. Other aspects are also described.

BACKGROUND

Data bus drivers, formats of data driven onto a data bus, bus types, and other aspects of data bus drivers and their buses are many and varied. No driver is 100% efficient at charging or discharging the capacitance of a bus wire to drive data onto a bus, and all of them use electrical energy and generate heat from the dissipation of the electrical energy when driving.

SUMMARY

Electronic components in proximity to data bus drivers tolerate heat from the driver, but may degrade in performance. Typical solutions of using a heat sink or applying air or liquid cooling do address heat removal, but they may not be practical for providing thermal insulation from the driver. A data bus driver and related method are presented here that may solve a problem of thermally related interference. The problem is observed when a driver dissipates heat in a data-dependent manner, affecting how a nearby component produces its "data" which is driven by the driver.

In one aspect, a data bus driver (also referred to here as a data driver or simply a driver) has a group of transistors that are configured to be coupled to a bus. The transistors drive the bus at time slots, to express their data on the bus. The transistors dissipate a first amount of electrical energy, when driving the bus during a first time slot to a bit value (logic level) opposite to a bit value present on the bus in an immediate preceding timeslot. The transistors are also configured (arranged) to dump a second amount of electrical energy. The second amount of electrical energy is equivalent to or comparable to the first amount of electrical energy. The dumping of the second amount of electrical energy occurs during a second time slot (or during a time slot that is subsequent to the second time slot), and is responsive to the bus' driving of a bit value in the second time slot that is the same as was present on the bus in an immediate preceding timeslot (preceding the second timeslot.)

In another aspect, a system has a first bus driver and a second bus driver. The first driver is configured to be coupled to a bus to drive the bus at first time slots (e.g., even numbered slots.) The second driver is configured to be coupled to the bus to drive the bus at second time slots (e.g., odd numbered slots.) The second time slots are interleaved with the first time slots. The first driver has a current dump circuit. The current dump circuit dumps a second amount of electrical energy when the first driver drives the bus during one of the first time slots to a logic level that is the same as a preceding second time slot logic level driven onto the bus by the second driver. The second amount of electrical energy is equivalent to a first amount of electrical energy. The first amount of electrical energy is the amount dissipated by the first driver when the first driver drives the bus during a time slot to a logic level opposite to a corresponding preceding time slot logic level driven onto the bus by the second driver.

Yet another aspect is a method for driving a data bus. The data bus is driven by a data bus driver. The bus is driven during a first time slot to a logic level opposite to a logic level present on the bus in an immediate preceding timeslot. This driving uses a first amount of electrical energy that is absorbed by the driver. The driver dissipates the first amount of electrical energy as heat. The bus is driven by the driver during a second time slot to a logic level that is the same as present on the bus in a timeslot immediately preceding the second time slot. Also, the driver dumps a second amount of electrical energy during or after the second timeslot. The second amount of electrical energy is equivalent to the first amount of electrical energy. The second amount of electrical energy is dissipated as heat by the driver.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Figure 1:
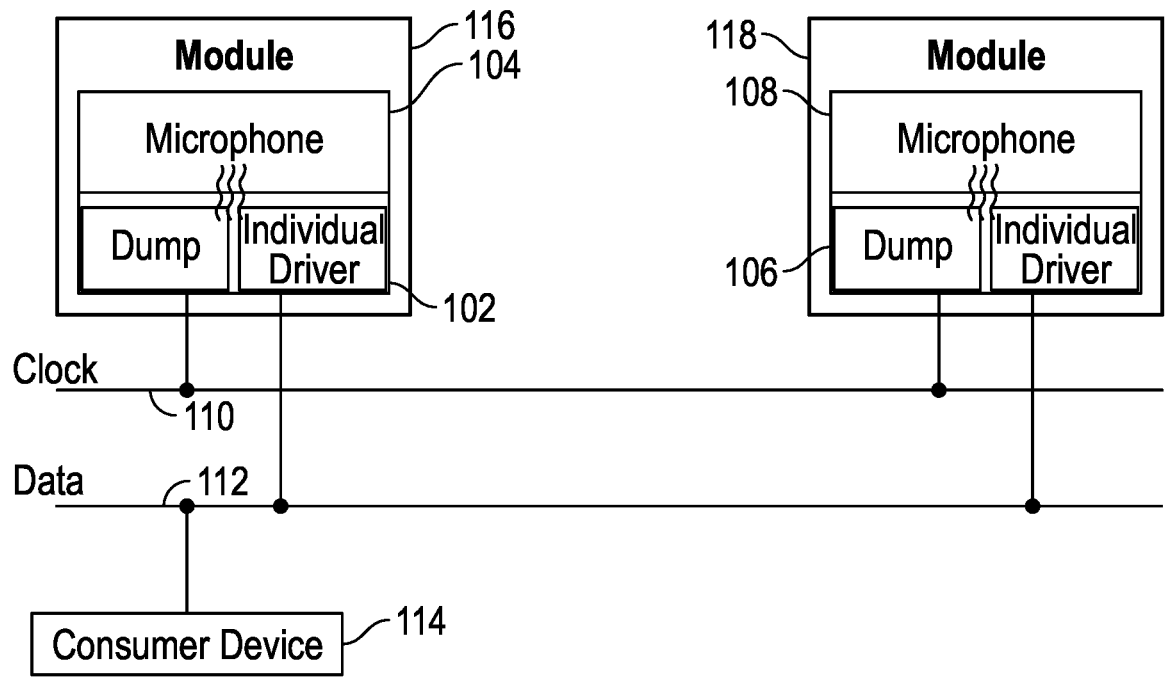
FIG. 1 depicts a system that has two microphone modules, each with a microphone and a data bus driver that is driving data onto a bus and dissipating electrical energy as heat.

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

Described herein, in various aspects, is a data bus driver that when used as part of a bus module (bus device) may provide a solution to a crosstalk or interference problem between two or more modules. In one aspect, the modules may be digital microphones that are to be attached through their respective drivers to the same bus wire of a multi-drop, time multiplexed bus (e.g., a "single wire", serial communication bus, having only three wires, e.g., a data wire, a power supply return wire, and a clock wire, although other types of bus arrangements are possible, e.g., a four-wire bus.) Variations of the circuits, timing and operation of the drivers described here may be applicable to other interference problems, or component problems, arising from data-dependent heating of drivers and nearby components, including other types of sensors and other types of communication buses.

The interference mechanism is thermal and, in one aspect, is caused by the power dissipation in a driver being dependent on the state of the bus just prior to present state. The bus state is driven in alternating time slots in the dual driver version depicted herein, but this aspect of the disclosure is also applicable to a single driver scenario, and to a system in which there are more than two drivers. If the driver needs to change the state of the bus, then the increased power in the driver heats the microphone (or other sensor) slightly. In the case of an encapsulated microphone, the increase in power also raises the gas pressure slightly in a microphone capsule, which corrupts the output audio signal of the microphone. Some microphones have low self-noise, such that this heating mechanism measurably decreases performance.

Aspects described herein may provide:

i) A driver which has constant power dissipation whether it needs to transition the state of the bus to a different bit value, or maintain the previous bit value.

ii) Decoupling of the driver power from the bit value placed on the bus by each microphone eliminates the thermally induced crosstalk mechanism (where uneven self-heating in a first microphone is caused by the driving of the bus by a second microphone.)

iii) An example implementation uses a constant current data driver. Electrical energy used and dissipated by the driver to drive a bus transition is determined. This electrical energy heats not only the driver itself but also a microphone (or other component, e.g., another type of sensor that may be co-packaged with the driver). A like amount of electrical energy is dumped by a dump circuit, if the bus state does not need to be changed. This like amount of electrical energy also heats the driver and the microphone (or other component) whose data it is driving. As a result, when viewed for example as an average over multiple time slots, the average amount of electrical energy being dissipated as heat, which in turn heats the driver and its microphone (or other component), remains relatively constant, so that temperature of the microphone is stable and its performance is not degraded.

iv) Rise or fall time of bus transitions could be measured by a circuit in the driver, or it may be designed-in, based on bus capacitance and known driver charge current. This information can be used for design values, or trimming component(s) to adjust the amount of electrical energy dumped by the dump circuit.

v) Even a fixed value of assumed current for the dump circuit offers significant improvement to the interference mechanism, for low-cost implementations.

vi) Applicability of the various aspects disclosed herein is not limited to any particular bus driving scheme, e.g., pulse density modulation, PDM, and is more generally applicable to thermally induced interference from an earlier driven bit value or bus symbols.

FIG. 1 depicts an example system that has two modules 116, 118, each with a microphone 104, 108 and drivers 102, 106, driving data onto a data bus wire (data bus 112) and dissipating electrical energy in each module as heat (wave symbols.) A clock (not shown) determines timing for the drivers 102, 106, by driving a clock bus wire (clock bus 110) and as further discussed below. In some versions, a data consumer device 114 is attached to the data bus 112. The data consumer device 114 can be, for example, an audio module for live reproduction and for listening to the audio signals that are digitized and driven onto the data bus 112 by one or both of the drivers 102, 106. As another example, the data consumer device 114 can be a radio communications module for uplink transmission of the audio signals.

A problem arises when an individual driver circuit dissipates electrical energy as heat in a manner that is dependent on the data that is driving onto the data bus 112. The microphone 104, such as an encapsulated microphone, is heated more by the physically adjacent driver integrated circuit for some data sequences, and less for other data sequences, causing the audio signal produced by the microphone 104 to act as if the microphone 104 was reacting to sound not actually present and thereby corrupting the data that the driver was driving onto the bus. It was discovered that the data-dependent variable heating of the gas in the encapsulated microphone 104 was applying a changing pressure on its microphone diaphragm. This interference with or degradation of microphone performance is undesirable.

A solution presented herein is in the form of a dump circuit and its associated control (for timing purposes), as part of one or both drivers 102, 106. The dump circuit determines when, for a given bus timing slot, there is no transition in the bus state, and in response dumps and therefore dissipates as heat electrical energy in the given bus timing slot. This compensates for, or rather attempts to balance, the electrical energy that is dissipated as heat in one or more prior bus timing slots in which there was a bus transition. As a result, the average heat generated and dissipated by the driver 102, 106 is even or constant across multiple time slots of the data bus 112, independent of the data being driven onto the data bus 112. With like amounts of electrical energy being used and dissipated as heat for each time slot, sometimes by the driver 102, 106 driving a transition and sometimes by dumping electrical energy when there is no bus transition, the heating of the microphone 104, 108 is stabilized and even, across the bus cycles or time slots, and is no longer data-dependent. In other words, while the data bus driver is driving the bus with sensor output data, its average power consumption stays constant regardless of content of the sensor output data. Sensor performance is improved because the sensor is not interfered with due to uneven heating over time.

Figure 2A:
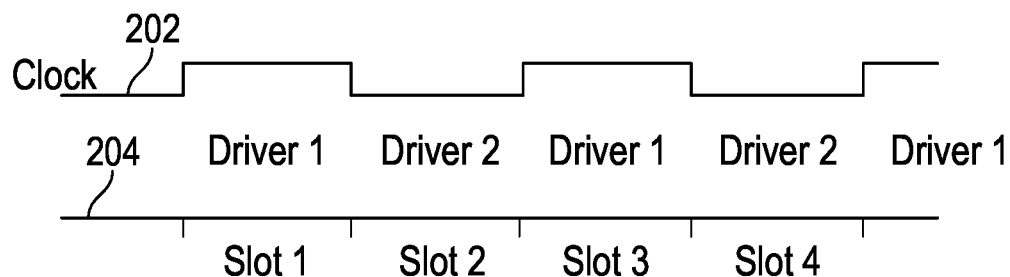
FIG. 2A is a timing diagram of a clock waveform and time slots used in an aspect of the driver of FIG. 1.

FIG. 2A is a timing diagram of a clock waveform 202 and time slots 204 used in an aspect of the driver of FIG. 1. The clock waveform 202, which is expressed on clock bus 110 in FIG. 1, defines time slots 204 for communicating on the data bus 112 and for use by the drivers 102, 106. The drivers 102, 106 alternate when driving the bus 112, in alternate time slots 204. For example, driver 1 drives a data bit onto the bus 112 during slot 1, driver 2 drives a data bit (which could have the same or a different value, e.g., the opposite value) onto the bus 112 during slot 2, driver 1 drives a data bit (same or opposite value) onto the bus 112 during slot 3, driver 2 drives a data bit (same or opposite value) onto the bus 112 during slot 4, etc. The bus 112 is thus time shared by the drivers 102, 106, to for example carry the audio signals produced by the microphones 104, 108, respectively. Each driver is driving the bus at time slots interleaved with time slots being driven by the other bus driver. Non-overlap circuitry may be used in some versions, so that there is not a situation in which both drivers drive the bus at the same time.

Variations of the system shown in FIG. 1 could be a system having a single driver 102, or more than two drivers, and also could have more drivers driving onto a wider bus (e.g., more bus wires). Each driver encounters the situation where, in a given time slot 204, the driver could be driving the same bit value or logic level (e.g., represented by a given voltage level) onto the bus 112 as was previously present, or driving a different bit value or logic level (e.g., represented by a different voltage level) as was previously present, in the immediate previous time slot 204.

Figure 2B:
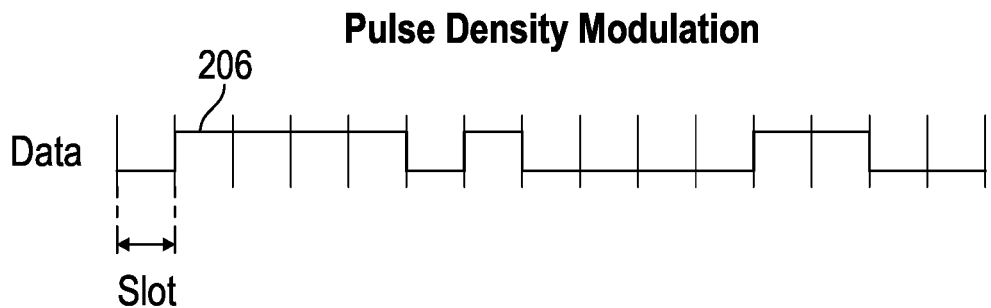
FIG. 2B is an example timing diagram of a pulse density modulation (PDM) waveform used in an aspect of the driver of FIG. 1.

FIG. 2B is a timing diagram of a pulse density modulation waveform 206 used in an aspect of the driver of FIG. 1. Many types of coding for data based on microphone 104 output could be considered, the present aspect depicts but one. In pulse density modulation, the number and relative density of the logic levels (e.g., binary logic, as ones and zeros) represents an analog value, in this case from the microphone 104. One mechanism for converting pulse density modulation back to an analog signal is to feed the pulse density modulation waveform 206 through a low-pass filter, possibly with amplification. In FIG. 1, each of the modules 116, 118 could produce a respective pulse density modulation waveform 206, and their drivers 102, 106 alternate driving this waveform one bit at a time into a respective time slot 204 on the bus 112. In one aspect, driver 1 and driver 2 are part of a dual audio or stereo audio PDM driver.

Figure 3:
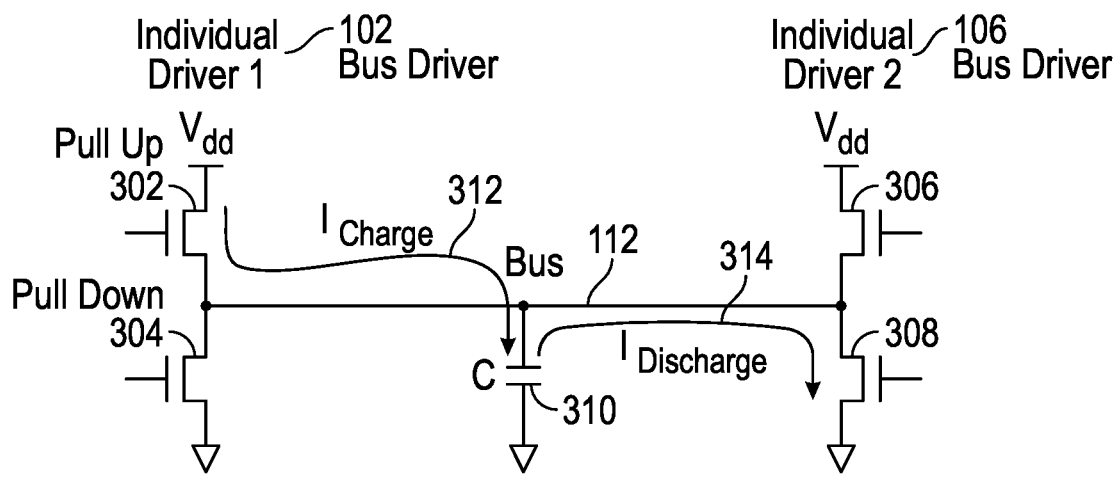
FIG. 3 is s schematic diagram of an example transistor circuit for part of the drivers of FIG. 1.

FIG. 3 is a circuit diagram of part of an example transistor-based individual driver circuit for use in each of the drivers 102, 106 of FIG. 1. A capacitor 310, labeled "C", represents all capacitance on the bus 112, be it parasitic or by design, for example from metal traces of an integrated circuit or a printed circuit board that defines the bus wire, transistors, ESD (electrostatic discharge) protection structures, EMI (electromagnetic interference) mitigation capacitors, noise mitigation capacitor, etc. In this scenario, a pull-up transistor 302 of the driver 102 labeled "individual driver 1" provides a charging current Icharge 312 from a power supply rail Vdd to charge up the bus 112 (e.g., to drive a logic one onto a single data wire of bus 112) during one time slot 204. In the following time slot 204, a pulldown transistor 308 of the driver 106 labeled "individual driver 2" provides a discharge current Idischarge 314 to discharge the bus 112 (e.g., to drive a logic zero onto the bus 112), sinking the discharge current to ground (or other power return rail). Pull-up transistors 302, 306 and pulldown transistors 304, 308 are nominally depicted as MOSFETs and could be NMOS (N type metal oxide semiconductor), PMOS (P type metal oxide semiconductor), other types of FET (field effect transistor), bipolar, or other technology as readily devised in keeping with the teachings herein.

Figure 4:
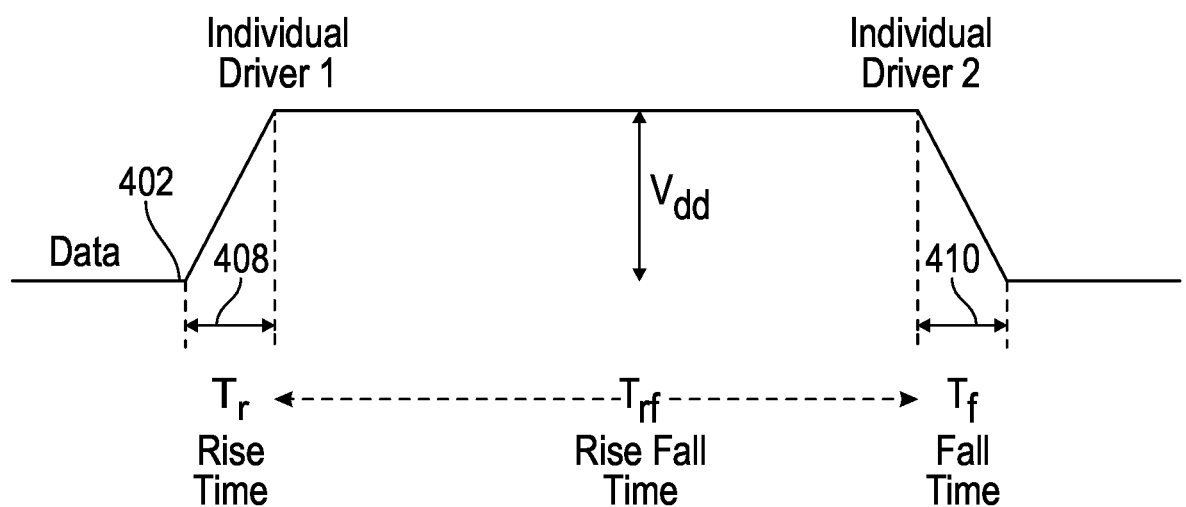
FIG. 4 is a timing diagram of rise and fall times, voltage across a pull-up and current through the pull-up, for the drivers of FIGS. 1 and 3.
Figure 4:
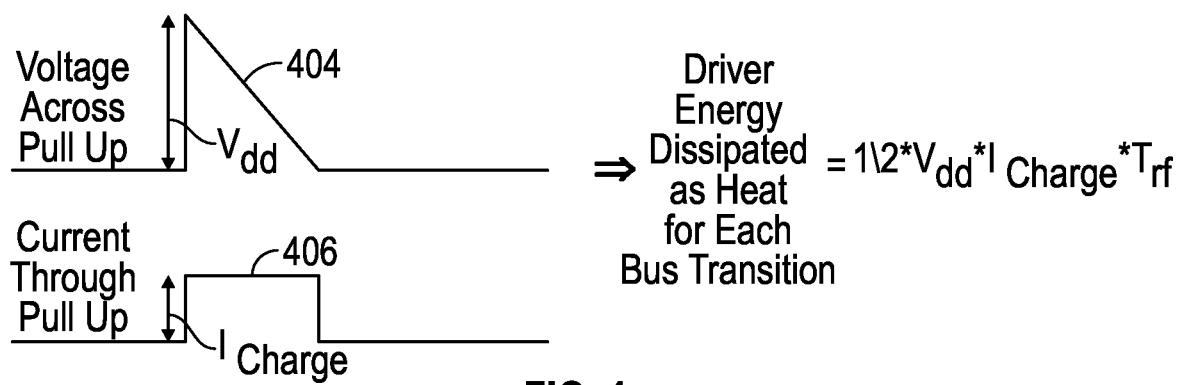

FIG. 4 is a timing diagram of rise and fall times, voltage across a pull-up and current through the pull-up, for the drivers 102, 106 of FIGS. 1 and 3, in one aspect. As driver 1 drives the charging current Icharge 312 onto the bus 112 and capacitor 310, voltage on the data line waveform 402 (e.g., on bus 112 in the scenario of FIG. 3) rises from the zero level to the one level, in this case from ground to Vdd during a rise time Tr 408. As bus driver 2 drives (sinks) the discharge current Idischarge 314 from the bus 112 and capacitor 310, voltage on the data line 402 waveform (e.g., on bus 112) falls from the one level to the zero level, in this case from Vdd to ground during a fall time Tf 410. In some versions, the rise and fall times are approximately equal, or drivers can be designed to make them so, or for purposes of analysis an average rise fall time Trf is considered as a stand-in for either.

A voltage waveform 404 of voltage across a pull-up 302 of the driver 102, e.g. bus driver 1, depicts the voltage initially at Vdd when the pull-up 302 is switched on and the bus is at ground or zero volts, and dropping diagonally during the rise time Tr 408 to zero volts as the bus 112 and capacitor 310 are charged up to Vdd. A current waveform 406 shows the current through the pull-up at zero before and after the rise time Tr 408, and at Icharge during the rise time Tr 408. Related waveforms are readily constructed for the pulldown 308 and fall time Tf 410. From this analysis, it is seen that the driver energy dissipated as heat for each bus transition is 0.5*Vdd*Icharge*Trf, which is the area under (or integral of) the product of the voltage and current curves for the pull-up 302 or the pulldown 308 during a transition from zero to one or one to zero, respectively, on the bus 112.

In various aspects, a data bus driver also has, in addition to its individual driver circuit (e.g., see FIG. 3) a dump circuit (which includes associated control or timing circuitry), that dumps an equivalent amount of energy as the individual driver circuit, when the latter is not driving any logic level transition on the bus 112. That occurs when the driver is driving the same bit value during a current time slot 204 as was present in the immediately previous time slot 204. In some versions, the amount of energy that is dumped by the dump circuit is tunable, for example by laser trimming, fuse blowing, switching on or off components in parallel or series, etc. In one version, only one of the drivers 102, 106 has a dump circuit. In another version, each of the drivers 102, 106 has a respective dump circuit, where one is complementary to the other in terms of timing and activation. That is, a first dump circuit that is part of or associated with the driver 102 is active in a given time slot while a second dump circuit that is associated with the driver 102 is inactive, and then in a subsequent time slot the second dump circuit becomes active while the first dump circuit is inactive, according to the conditions described herein.

An example of the amount of electrical energy dissipated by the driver as heat in a transition on the bus, which in turn governs the equivalent amount of energy that is to be dissipated as heat by the dump circuit, is as follows.

Cb 56 pF (bus capacitance)
Icharge 5 mA
Vdd 1.8V
Fbus 3 MHz
Trf 20 ns
Erf 90 pJ (transition dissipation in the driver and the microphone module)

Ideally, the amount of electrical energy dissipated by the dump circuit during a slot in which the driver is not driving a bit value or bus state transition on the bus is equivalent to, or comparable to, the amount of electrical energy dissipated by the driver during a slot in which the driver is driving a bit value transition on the bus. For practical considerations of real-world equivalence, in one aspect, the amount of energy dissipated by the dump circuit could be, for example, between one half and twice the amount of energy absorbed and dissipated by the driver during a bus transition. Or, the amount of energy dissipated by the dump circuit could be within design, manufacturing and operation tolerances of the amount of energy absorbed and dissipated by the driver during a bus transition.

A dump circuit could be combined with the individual driver circuit of an associated data bus driver on the same integrated circuit die, or it could be on a separate integrated circuit die, or it could be implemented with discrete circuit elements. A dump circuit and its associated individual driver circuit should share the same thermal dissipation mechanism (e.g., common substrate, printed circuit board, encapsulation and/or heat sink if used, etc.), so that the heat which the individual driver circuit and the dump circuit produce is dissipated evenly, in the physical sense as well as over time, especially in relation to how that heat is experienced by the microphone whose audio signal output is being driven by the individual driver circuit onto the bus.

Figure 5A:
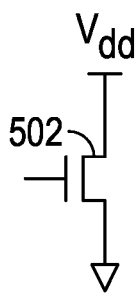
FIG. 5A is one aspect of a dump circuit for a driver, showing a transistor dump.

FIG. 5A shows one aspect of an example dump circuit, being a transistor dump. Not shown is the control and timing circuitry which governs when the dump circuit is active (dumping energy), responsive to determining whether or not its associated individual driver circuit will be transitioning the bus state in the preset bus timing slot (relative to the immediately preceding bus timing slot). A transistor 502, which could be a long channel MOSFET or other transistor suitable for handling current between Vdd and ground and dissipating heat, is turned on and off by the control and timing circuitry, for an appropriate time interval (as further discussed below with reference to FIG. 6), to dump electrical energy.

Figure 5B:
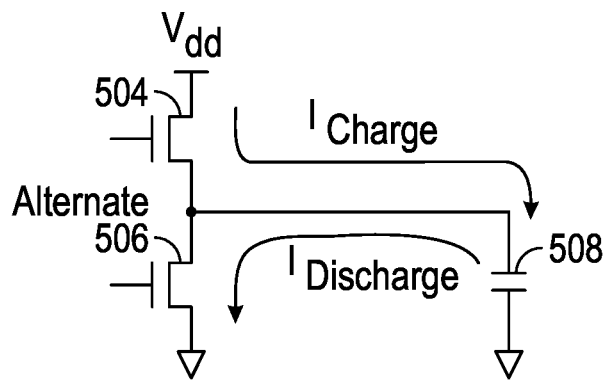
FIG. 5B is one aspect of a dump circuit for a driver, showing a dummy capacitor load dump.

FIG. 5B is one aspect of another example dump circuit, showing a dummy capacitor load dump. A transistor 504 provides a charging current Icharge to charge up a dummy capacitor 508, and another transistor 506 provides a discharge current Idischarge to discharge the dummy capacitor 508. The dummy capacitor 508 is not attached to the bus 112, but is instead a separate capacitor that is part of the dump circuit and only used for purposes of charging and discharging to dump electrical energy. Control of the transistors 504, 506 alternates between charging and discharging, so that both transistors 504, 506 are not ON at the same time. For example, for one electrical energy dump, the capacitor 508 could be charged up, and for another, later energy dump the capacitor 508 could be discharged.

Figure 5C:
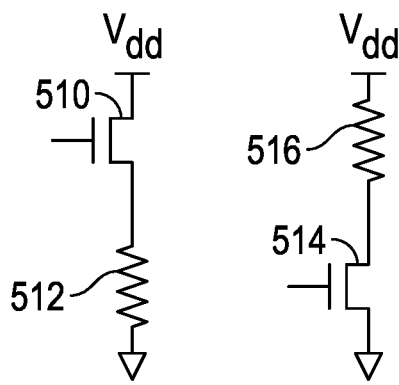
FIG. 5C is one aspect of a dump circuit for a driver, showing resistive load dumps.

FIG. 5C is one aspect of yet another example dump circuit, being a resistive load dump. A resistor 512 is attached to ground and a pull-up transistor 510, in one version. A resistor 516 is attached to Vdd and a pulldown transistor 514, in another version. Turning ON the pull-up transistor 510, or the pulldown transistor 514, passes current through the transistor 510, 514 and associated resistor 512, 516, from Vdd to ground. A resistor 512, 516 could be implemented as a separate resistive element or it may be integrated as part of a transistor 510, 514, for example made using the diffusion region and a resistive geometry in an integrated circuit. Further dump circuits are readily devised in keeping with the teachings herein.

Figure 6:
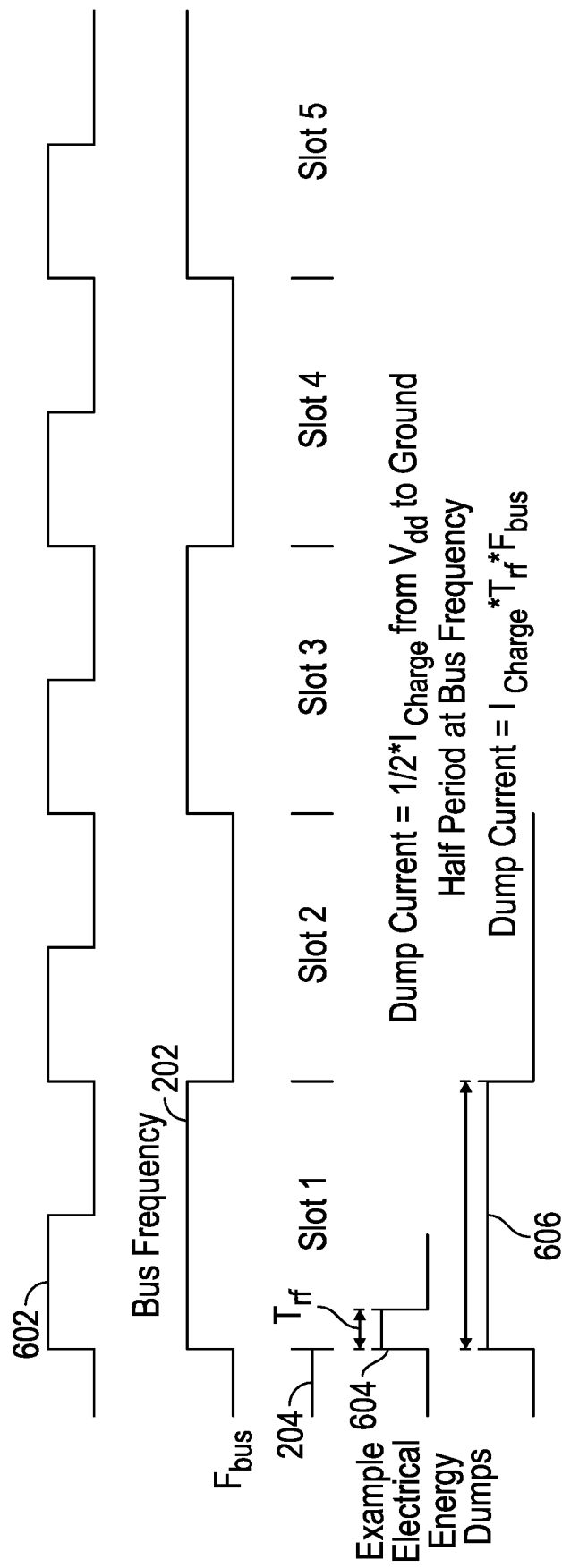
FIG. 6 is a timing diagram of electrical energy dumps, in an example of operation of the data driver of FIG. 1 with a dump circuit.

FIG. 6 is a timing diagram of electrical energy dumps, in an aspect of the operation of the bus driver of FIG. 1 having a dump circuit. Two clock waveforms 602, 202 are shown, the first clock waveform 602 cycling once per time slot 204, the second clock waveform 202 cycling at half that and defining a bus frequency Fbus for the time slots 204 on the bus 112. For example, the second clock waveform 202 could clock the two bus drivers 102, 106, with a rising edge of the clock indicating a bit is to be driven from the driver 102 in one time slot 204 and a falling edge of the clock indicating a bit from the driver 106 in the next time slot 204 (same as in FIG. 2A.)

For one aspect of an electrical energy dump, a dump activation waveform 604 (produced by the control and timing circuitry of the dump circuit) activates the dump circuit to dump electrical energy during the rise-fall time Trf. In one version, the dump current is equal to 0.5*Icharge from Vdd to ground during Trf, so that the electrical energy dumped is equivalent to the electrical energy absorbed and dissipated as heat by the associated individual driver circuit during a typical transition on the bus 112 (see calculation presented above regarding FIG. 4).

In another aspect of an electrical energy dump, a dump activation waveform 606 activates a dump circuit to dump electrical energy during a half period at the bus frequency. In one version, the dump current is equal to Icharge*Trf*Fbus from Vdd to ground during the half period, so that the electrical energy dumped is equivalent to the electrical energy absorbed and dissipated as heat by the individual driver circuit, during a typical transition on the bus 112.

The control and timing circuitry needed to control the timing of the activation and deactivation of a dump circuit (responsive to i) the bit value that is to be driven in a given slot and ii) the bit value that was driven in the immediately preceding slot) is not shown but can be readily developed, in keeping with the teachings herein. In one aspect, rather than respond to each time slot individually, the control and timing circuitry of the dump circuit could track a number of non-transitioning time slots, and then signal or perform an electrical energy dump afterwards with an amount of electrical energy equal to the sum of electrical energy that would have been dissipated as heat during a transitioning time slot, for that number of non-transitioning time slots. Still further, since the time constant for heat dissipation is substantially longer than the period of the bus clock, it may not be necessary to perform the energy dump in the same time slot as a non-transitioning bit value, or even immediately after; rather, an appropriate delay (following a slot in which the bit value or bus state did not transition) could be determined, for example through experimentation or simulation, that is acceptable before performing the energy dump. In other words, in one aspect, the data bus driver can dump electrical energy that is about equal to that dissipated during a bus state transition, by the data bus driver, in every subsequent time slot in which the logic level on the bus does not change. In another aspect, dumping of electrical energy by the data bus driver may be prevented until after two or more subsequent non-transitioning time slots (in each of which the logic level on the bus did not change) have passed.

Figure 7:
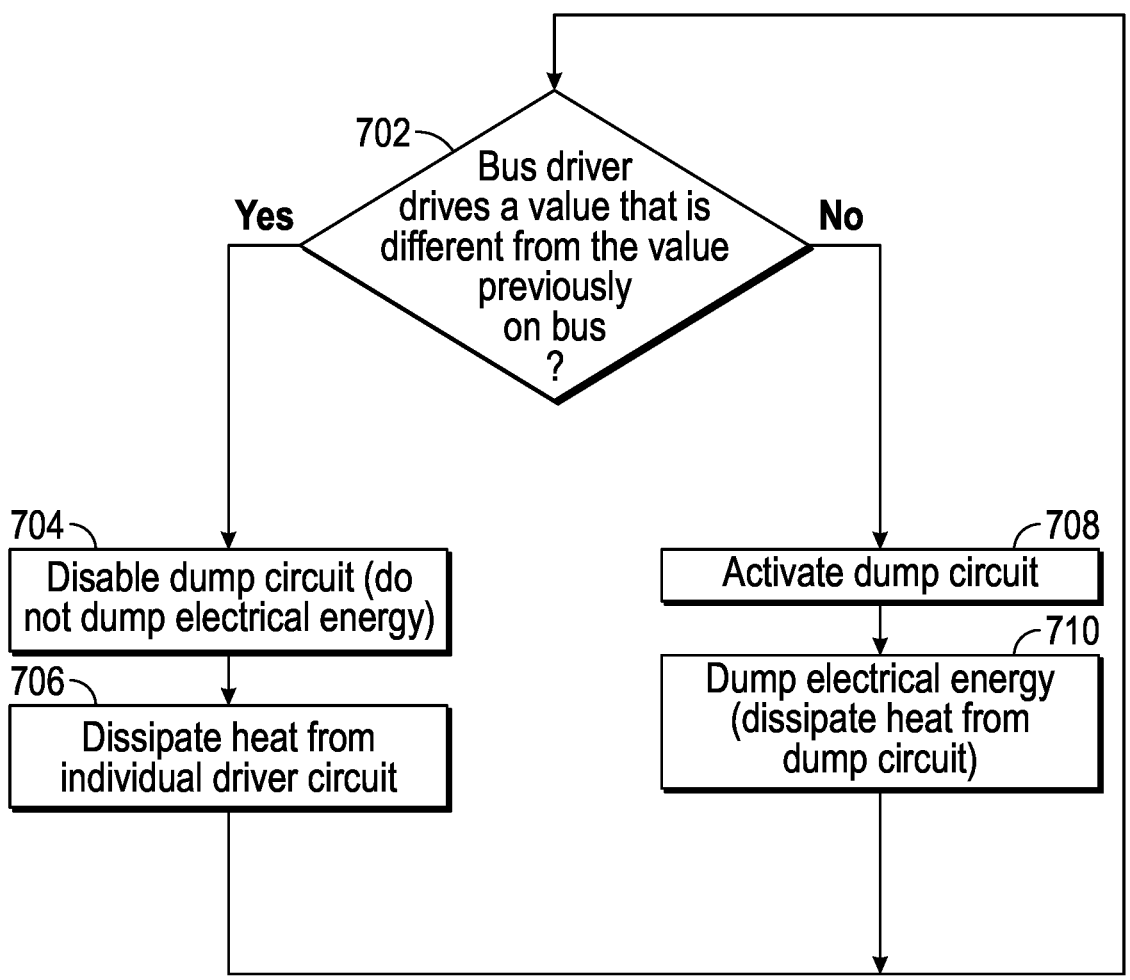
FIG. 7 is a flow diagram for an example operation of the driver with a dump circuit.

FIG. 7 is a flow diagram for operation of a data bus driver with a dump circuit. In a determination action 702, it is determined whether the bus driver drives out a value that is different from a value previously on the bus. This determination could occur from sampling the bus, receiving communication on a side channel, knowledge of the microphone or other sensor data that is being driven, observation of various logic levels (their associated voltage or current levels) on the bus, etc.

If the answer in the determination action 702 is yes, then in action 704 the dump circuit is disabled so that electrical energy is not dumped by the dump circuit and the bus driver drives out a bit value that is different from the bit value previously on the bus. The flow in this case includes the action 706, in which heat from the individual driver circuit is dissipated due to its driving of a transition in the bust state. Flow proceeds from action 706 back to the determination action 702, in a loop, for the next bit value to be driven on the bus.

If the answer in the determination action 702 is no, then flow proceeds to the action 708 in which the dump circuit is activated which results in action 710 in which electrical energy is dumped by the dump circuit so that heat is dissipated by or from the dump circuit. In this case, heat is not dissipated by the individual driver circuit which does not drive a bit value that is different from the bit value previously on the bus, e.g., the individual bus driver circuit maintains or drives out a value that is the same as the value previously on the bus. Flow proceeds from the action 710 back to the determination action 702, in a loop, for the next bit value (e.g., sensor output data) to be driven on the bus.

In the above method and flow diagram, assuming the electrical energy dump is tuned properly, the same amount of energy is dissipated from the bus driver in the "yes" branch from the determination action 702 as from the dump circuit in the "no" branch from the determination action 702. As a result, over a long sequence of time slots, the amount of energy being dissipated in the combination of the driver and the dump circuit is the same, regardless of which branch is taken and how many times a given branch is taken in the sequence. The amount of heat that is dissipated is therefore independent of the data signal (e.g., sensor output data) that is being driven onto the bus. The driven data provided by the bus to a consuming device (e.g., an audio signal from a microphone) is neither affected by heat nor does it suffer from heat induced interference.

While certain aspects have been described and shown in the accompanying drawings, it is to be understood that such are merely illustrative of and not restrictive on the broad invention, and that the invention is not limited to the specific constructions and arrangements shown and described, since various other modifications may occur to those of ordinary skill in the art. For example, while FIG. 1 depicts a system having two bus drivers in respective microphone modules, it also possible to have only a single data driver (with its associated dump circuit), or a system with more than two such bus drivers coupled to the same bus; also, FIGS. 5A-5C depict various dump circuits which could be implemented with other types of transistors; there may also be modules that have other components besides microphones (e.g., other types of sensors) that could benefit from being packaged with the bus drivers described above to reduce thermally induced interference (induced from within the same module or induced due to operation of another module on the same bus); and the control and timing in a dump circuit may vary from the particular approaches described above. The description is thus to be regarded as illustrative instead of limiting.

What is claimed is:

1. A system of data bus drivers, comprising:
   a first bus driver configured to be coupled to a bus to drive the bus at a plurality of first time slots; and
   a second bus driver configured to be coupled to the bus to drive the bus at a plurality of second time slots interleaved with the first time slots,
   wherein the first bus driver has a dump circuit configured to dump a first amount of electrical energy when the first bus driver is not transitioning a logic level of the bus in one slot of the first time slots relative to a preceding slot of the second time slots that was driven by the second bus driver, the first amount of electrical energy being equivalent to a second amount of electrical energy that is dissipated by the first bus driver when the first bus driver is transitioning the logic level of the bus.

2. The system of claim 1, wherein the bus is a single data wire bus and the first bus driver and the second bus driver are part of a dual or stereo audio pulse density modulation (PDM) driver module.

3. The system of claim 1, further comprising:
   a clock that is used by the first and second bus drivers to drive the bus according to the time slots, with a rising edge of the clock indicating that a bit value be driven by the first bus driver in each of the first time slots, and a falling edge of the clock indicating that a bit value be driven by the second bus driver in each of the second time slots.

4. The system of claim 1, wherein the first bus driver, on average over multiple consecutive first time slots and second time slots, dissipates constant power regardless of the bus exhibiting transitioning logic levels and maintained logic levels, as a result of the dump circuit.

5. The system of claim 1, wherein the dump circuit is controlled to dump the first amount of electrical energy each time the first bus driver is not transitioning the logic level of the bus.

6. The system of claim 1, wherein the dump circuit is controlled to delay its dumping of the first amount of electrical energy by one or more time slots, following a time slot in which the first bus driver is not transitioning the logic level of the bus.

7. The system of claim 1, further comprising:
   the second bus driver having a further dump circuit.

8. A method for driving a data bus, comprising:
   driving a bus, by a data bus driver, in a first time slot to a logic level different from a logic level that is present on the bus in an immediately preceding time slot, using a first amount of electrical energy that is consumed by the data bus driver;
   driving the bus, by the data bus driver, in a second time slot to a logic level that was present on the bus in a time slot immediately preceding the second time slot; and
   dumping, by the data bus driver, during the second time slot or during a subsequent time slot in which the logic level on the bus does not change, a second amount of electrical energy to increase heat dissipation by the data bus driver.

9. The method of claim 8, wherein the data bus driver is driving the bus with sensor output data and average power consumption by the data bus driver stays constant regardless of content of the sensor output data.

10. The method of claim 8, further comprising dumping the second amount of electrical energy, by the data bus driver, in every subsequent time slot in which the logic level on the bus does not change.

11. The method of claim 8, further comprising preventing dumping of the second amount of electrical energy, by the data bus driver, until after a plurality of subsequent time slots in each of which the logic level on the bus did not change.

12. The method of claim 8, further comprising:

driving the bus, by a further data bus driver, during a third time slot to a logic level different from a logic level present on the bus in a time slot immediately preceding the third time slot, using a third amount of electrical energy;

driving the bus, by the further data bus driver, during a fourth time slot to a logic level same as present on the bus in a time slot immediately preceding the fourth time slot; and dumping, by the further data bus driver, during or after the fourth time slot, a fourth amount of electrical energy equivalent to the third amount of electrical energy.

13. The method of claim 8, wherein driving the bus during the first, the second and subsequent time slots comprises driving an audio signal from a microphone, wherein dissipated heat of the first and second amounts of electrical energy is heating the microphone a same amount on average across multiple time slots, independent of transitions or maintenance of previous bit values on the bus.

14. The method of claim 8 wherein the bus is a single data wire bus and the data bus driver is part of a dual or stereo audio pulse density modulation (PDM) driver module.

15. The method of claim 14 wherein a clock is used by the data bus driver to drive the bus according to a first plurality of time slots, with a rising edge of the clock indicating that a bit value be driven by the data bus driver in each of the first plurality time slots, and a falling edge of the clock indicating that a bit value be driven by another data bus driver in each of a second plurality of time slots.

16. The method of claim 15 wherein the another data bus driver is part of the dual or stereo audio PDM driver module.

17. The method of claim 16 further comprising driving the bus, by the another data bus driver, in a third time slot to a logic level different from a logic level that is present on the bus in an immediately preceding time slot, using an amount of electrical energy that is consumed by the another data bus driver;

driving the bus, by the another data bus driver, in a fourth time slot to a logic level that was present on the bus in a time slot immediately preceding the fourth time slot; and dumping, by the another data bus driver, during the fourth time slot or during a subsequent time slot in which the logic level on the bus does not change, an amount of electrical energy to increase heat dissipation by the data bus driver.

18. The method of claim 8 further comprising driving the bus, by another data bus driver, in a third time slot to a logic level different from a logic level that is present on the bus in an immediately preceding time slot, using an amount of electrical energy that is consumed by the another data bus driver;

driving the bus, by the another data bus driver, in a fourth time slot to a logic level that was present on the bus in a time slot immediately preceding the fourth time slot; and dumping, by the another data bus driver, during the fourth time slot or during a subsequent time slot in which the logic level on the bus does not change, an amount of electrical energy to increase heat dissipation by the data bus driver.

19. The method of claim 18 wherein the bus is a single data wire bus and the data bus driver and the another data bus driver are part of a dual or stereo audio pulse density modulation (PDM) driver module.

* * * * *